United States Patent

Tammarate

[11] Patent Number: 5,962,676
[45] Date of Patent: Oct. 5, 1999

[54] PROCESSES FOR THE MODIFICATION AND UTILIZATION OF BACTERIAL CELLULOSE

[75] Inventor: Pramote Tammarate, Bangkok, Thailand

[73] Assignee: The Thailand Research Fund, Bangkok, Thailand

[21] Appl. No.: 08/782,735

[22] Filed: Jan. 13, 1997

[51] Int. Cl.$^6$ .............................. C08B 15/00; D21C 5/00
[52] U.S. Cl. .............................. 536/56; 536/127; 162/47; 162/91
[58] Field of Search .............................. 536/30, 56, 124, 536/127; 162/157.1, 47, 91

[56] References Cited

U.S. PATENT DOCUMENTS

| | | | |
|---|---|---|---|
| 4,960,763 | 10/1990 | Stephens et al. | 514/57 |
| 5,273,891 | 12/1993 | Byrom | 435/101 |

FOREIGN PATENT DOCUMENTS

| | | |
|---|---|---|
| 346507 | 12/1989 | European Pat. Off. . |
| 63309529 | 12/1987 | Japan . |
| 64-50815 | 2/1989 | Japan . |
| 02053454 | 2/1990 | Japan . |
| 02135609 | 5/1990 | Japan . |
| 05-051885 | 3/1993 | Japan . |
| 05-301902 | 11/1993 | Japan . |
| 05301902 | 11/1993 | Japan . |

OTHER PUBLICATIONS

Embuscado et al. *Food Hydrocolloids,* vol. 10(1): 75–82, 1996.

Atsushi Okiyama, Masao Motoki ane Shigeru Yamanaka, "Bacterial Cellulose III. Development of a New form of Cellulose," Food Hydrocolloids, Vo. 6, No. 6, issued 1993, pp. 493–501.

Embuscada, Bemiller, Marks, "Isolation and Partial Characterisation of Cellulose Produced by Acetobacter Tylinum," Food Hydrocolloids, vol. 10, No. 1, 1996.

Shigeru Yamanaka and Kunihiko Watanabe, "Applications of Bacterial Cellulose," Cellulosic Polymers Blends and Composites, Hanser Publishers; Cincinnati, Ohio.

Okiyama, Motoki and Yamanaka, "Bacterial Cellulose II. Processing of the Gelatinous Cellulose for Food Materials," Food Hydrocolloids, vol. 6, No. 5, 1993, pp. 479–487.

*Primary Examiner*—Howard C. Lee
*Attorney, Agent, or Firm*—Vangelis Economou; Dorn, McEachran, Jambor & Keating

[57] ABSTRACT

Treatment of gelatinous bacterial cellulose by breaking up gelatinous cellulose into a micro-fiber form and then evaporating water from the result with application of heat. The evaporation can be achieved by heating to a temperature above 100 degrees Centigrade and is continued for a sufficient time to be effective as the sole reason for evaporation of the moisture.

20 Claims, No Drawings

PROCESSES FOR THE MODIFICATION AND UTILIZATION OF BACTERIAL CELLULOSE

FIELD OF THE INVENTION

The present invention relates to a modified bacterial cellulose and to a method of manufacture of bacterial cellulose.

DESCRIPTION OF THE RELATED ART

Bacterial cellulose can be produced by micro-organisms of the Acetobacterium, Rhizobium, Alcoligenes, Agrobacterium and Pseudomonas types (see, for example, Brown, Jr et al Applied Polymer Science: Polymer Symposium (1983) V.37, (pp 33–78).

The term "bacterial cellulose" as used in this specification means cellulose produced by any of several bacteria of which Acetobacter xylinium is only one example. Bacteria can produce cellulose fiber while being cultivated in a still plate, where cellulose fibre is produced on the surface of nutrient which contacts air. Cellulose fibre can also be produced while being cultivated in agitated aerobic conditions (see, Byrom, U.S. Pat. No. 5,273,891).

Bacterial cellulose from Acetobacter xylinium and from other bacterial sources is dietary fibre, which is not digested in the gastrointestinal tract. Until now bacterial cellulose when it is dried under certain conditions becomes very hard and has a horn-like character (see, Stephens, et al, U.S. Pat. No. 4,960,763). This characteristic limits the usefulness of the fiber.

One way of overcoming this limitation is to freeze dry the product. Another is to dry it subsequent to treatment with a polyol which serves as a "bulking" agent. The polyol replaces in part or totally the water which holds the material in its original physical form. Since the bulking agent is non volatile under drying conditions it largely prevents the collapse of the microstructure when the water is removed. The bulked product can be either conventionally dried or freeze dried. Stephens also freeze dries the product at dry ice temperature (approximately –55° C.). Brown U.S. Pat. No. 4,924,128 discloses a method for producing modified bacterial cellulose by inoculating a quantity of nutrient medium comprising a polysaccharide derivative such as carboxymethyl cellulose (CMC) with cellulose producing microorganism. Substantially dried cellulose resulting from this procedure is highly absorbent. For example, a dry piece weighing 0.0134 grams absorbed distilled water and constituted a total weight of 1.479 grams.

It has been previously considered that the toughness of the fiber is the property of the microstructure of the cellulose itself and that cellulose cannot be produced without this property.

An object of this invention then is to provide a method of production of bacterial cellulose which can result in bacterial cellulose which is more useful than products that have hitherto been produced or at the least, offer the public a useful alternative to product that is currently available.

The present invention has resulted from a discovery that contrary to previous opinions, the material that causes toughening of the product is separate from the cellulose itself.

Accordingly there is proposed a method to produce gelatinous bacterial cellulose so that the result is less tough and therefore more useful.

SUMMARY OF THE INVENTION

According to this invention there is proposed a process for the modification of a gelatinous bacterial cellulose, which comprises of the steps of:

(i) treating gelatinous bacterial cellulose to bring this into a form of micro fiber, (ii) and then heating the resulting material to a temperature at least as high as 100° C. to an extent to effect a softening of the material and then causing remaining water to be substantially evaporated from the resultant material.

The method then provides for the production of modified bacterial cellulose where the quantity and characteristics of materials in the cellulose which would make the product hard and stiff after drying are changed or reduced. Product resulting from this method is highly absorbent, and can be recovered in its original form after passing through the human digestive system.

Cellulose fibre produced from bacteria under agitated and non-agitated conditions after drying conventionally will turn into horn-like material (see, Stephens et al, U.S. Pat. No. 4,960,763).

I have discovered that there are materials that make the dried product hard and tough in the bacterial cellulose fiber which is not the fibre itself. These materials can be accessed from the fiber which has been broken into micro-fibre form. This breaking up of the fiber can be achieved in different ways such as by use of enzymes, chemicals other than enzymes or by mechanical action.

It has been previously believed that the toughness of the fiber was the property of the microstructure of the cellulose and cellulose of this form could not exist without this property. The present invention shows that it is possible to consider separately and treat the materials that make the dried product hard and tough apart from the fiber.

Cutting the cellulose sheet into small pieces and washing the pieces with boiling water three times, each for about 10 minutes reduces several materials absorbed in the fiber, eg. sugars, acids, salts, minerals and other food products. Beating the fiber into micro-fibre form in water then further provides release of some of the toughening materials, and some of these materials will remain in the fiber. Washing several times with water and drying the fibre after each washing, pressing with screw press or separating water by decanter several times are examples of methods that will reduce the quantity of remaining toughening materials further. Fiber obtained this way has been found to be able to absorb water better, and when it is dried, the toughness is lessened.

We have discovered however that the bacterial cellulose can be modified into soft dietary fiber by heating the micro-fiber cellulose as obtained from the process described above to an extent that will inhibit hydrogen bonding and denature micro-fibril bonds. Such a temperature has been found in preference to be a temperature of above 100° C.

Water in the fiber is also to be removed and this can be achieved either by continuing the heating to an extent necessary to cause this or there can be other techniques used which can be used together with the heating or independently from heating such as providing reduced atmospheric pressure.

The fiber treated at high temperature and having its water caused to be evaporated quickly will no longer be tough. When water is added to this modified fiber again and the result dried in an incubator at 60° C. the dried product will not harden.

Rapid evaporation of water at high temperature according to this invention provides modified cellulose which does not harden when dry and can be used in several fields.

The method of heating can be varied but examples can be by use of a hot drum drier, spray dryers, extruder, village texturizer, microwave oven, hot oven, high temperature oven, and frying in hot oil. All these heating processes produce modified cellulose which does not harden when dry.

The product of one of the preferred embodiments of the present invention is dried by use of a hot drum drier.

The product is a soft and light fiber, easy to fold and can absorb a large quantity of water, because the toughening materials have been modified.

Examples of embodiments are as follows:
1. Evaporation of water on a high temperature drum drier, with a single or double rollers types, within a range of 100–200° C. and better results within a range of 120–170° C.
2. Evaporation of water in the atmosphere of hot air in a spray drier, preferred inlet temperature is within the range of from 200–250° C. and the outlet temperature is 130–150° C., depending on the rate of feeding the fiber into the drier and the amount of moisture in the fiber.
3. Evaporation by an extruder.
4. Evaporation at high temperature and pressure in a village texturizer at a preferred range from 100–200° C., and at a pressure within the range of from 200–700 psi.
5. Evaporation of water in a microwave oven until dry.
6. Rapid evaporation of water in a hot furnace or heated oven.
7. Evaporation of water in a hot medium, by frying in hot oil.

The nutrient that has been used for culturing the said bacterium when dry will also change to hard and tough materials because the toughening materials will be mixed in the culture medium. This problem can also be eliminated by evaporation of water at high temperature.

When the unmodified bacterial cellulose is mixed into other food materials, eg. starch, protein, fat, vitamins, mineral or other food additives, and modified by extruding from an extruder the bacterial cellulose is modified only to a small degree. The product is found to be still hard and brittle.

The modified bacterial cellulose according to the present invention has very good swelling property. One gram of the above cellulose, modified by hot drum drier, after absorption of water swells to 24.5 ml in 30 minutes, and swells to 28.0 ml in 18 hours. One gram of the said cellulose modified by a hot village texturizer at high pressure, after absorption of water swells to 22.5 ml in 30 minutes, and swells to 24.5 ml in 18 hours, which is lighter than fibre obtained from grain husks according to Holmgren, U.S. Pat. No. 4,951,960.

The modified cellulose of the present invention is ground into powder and fills into hard gelatine capsule No. 0. The dietary products have been swallowed as a part of normal diet by volunteers. The patients feel satisfied by taking less food than normal and losing some weight after taking the dietary products.

The modified cellulose fibre according to this invention after it was eaten will pass through the human digestive tract and according to our tests will remain unchanged.

DESCRIPTION OF THE PREFERRED EMBODIMENTS

For a better understanding of this invention this will now be described with reference to preferred embodiments which are now set out.

EXAMPLE 1

In this first example the modification of the bacterial cellulose is made by first washing the gelatinous bacterial cellulose of Acetobacter xylinium bacteria with water, cutting this into small pieces about 1×1 cm, washing these pieces with purified water, heating these in boiling water three times each for about 10 minutes to dissolve acetic acid, sugars and other food materials from the cellulose.

The clean cellulose fiber is then mechanically agitated to be broken up until micro-fibrillated fiber (micro-fiber) is obtained. This micro-fiber is then washed three times with water and the fiber dried on filter paper. The fiber is filtered off and washed again with water and the remaining water decanted from the fibre with a decanter. Repeating the decantation steps 2 or 3 times will increase water absorption properties and decrease the toughening properties of the fibre. The fiber obtained from the above method is then heat treated as will be described hereinafter. The cellulose after being treated as described above will be able to be modified more easily than the cellulose that has not been treated this way.

EXAMPLE 2

Processes for the separation of toughening materials from cellulose fibre

The bacterial cellulose of this example was produced in non-agitated culture by a strain of Acetobacter xylinium. The following medium was used in the culture: coconut milk, 5% by weight of sugar, 0.5% by weight of ammonium sulfate, and the pH was adjusted to 5.0 with acetic acid.

After 10 days, the cellulose fiber thus obtained was collected, washed well with water, cut into small pieces of about 1×1×1 cm, washed again with water and boiled in water for 10 minutes, and the water is decanted. Repeat of this boiling process another 2 times dissolves sugars and other food materials. The fiber was then blended in a high speed blender for 30 minutes. The micro-fiber obtained in this way was washed with water 3 times, and dried on filter paper after each washing. The micro-fibre was filtered, washed with water and then extracted with a decanter, ALFA LAVAL, Type NX207 S37) 3 times. The final cellulose fiber when tested did not harden when dry, and could absorb a large quantity of water.

Various drying treatments can be used, eg. using continuous centrifuge, WESTFALIA SEPARATOR, TYPE NA 7-06-076 and also using screw press. Drying with a decanter gave the best result and screw press gave a good product.

EXAMPLE 3

Various processes for modification of bacterial cellulose and materials from the cellulose Different kinds of cellulose fiber that were used in various modification processes.
1. Sheets of cellulose were used in various modification processes.
2. Cellulose fibre obtained from cellulose sheet by cutting into small pieces, blended in a high speed blender without boiling to wash out various food materials before blending and did not extract the toughening materials from the fiber.
3. Cellulose fibre obtained by cutting the cellulose sheets into small pieces and boiled it to dissolve the food materials and blended in high speed blender, but did not wash off the toughening materials.
4. The cellulose fibre from (3) which further wash off the toughening materials.

Characteristics of the bacterial cellulose after drying at temperatures below 100° C.

Cellulose sheets were boiled in hot water for 10 minutes, decanted off the water and repeated the above processes again twice. The resulted sheets were dried under the sun and in a hot air oven at 60° C. The dried sheets obtained were very tough and quite transparent. The cellulose sheets after boiling in hot water three times as described above were blended in a high speed blender until very fine fibre obtained. The resulted fiber were divided into two portions. One portion was dried under the sun, the other portion was dried in a hot air oven at 60° C. Both methods gave a white translucent sheets which were very hard.

A sample of bacterial cellulose which had been processed as described above, after blended in a blender but did not wash off the toughening materials, and another sample which had been carried out by the same methods, but had been washed off the toughening materials according to the process in example 2 were dried at room temperature, and another two equivalent samples were dried at 60° C., and two other samples were dried at 95° C. All samples after drying became hard, white and translucent sheets. The samples which had not had the toughening materials washed off were harder than the samples that had the toughening materials washed off.

Modification of bacterial cellulose by evaporation of water by hot air oven at high temperature Samples of bacterial cellulose with moisture content of 80% were modified by heating in an oven at 100°, 150°, 250°, 300° and 350° for 1, 2, 5, 10, 15, 20, 30 and 60 minutes respectively. The samples thicknesses were 1, 5, 10 and 20 mm respectively. The thinner samples of 1 mm dried quickly resulted in soft fiber. One gram of the resulting fiber swelled in water to 12.5 ml in 18 hours. The thicker samples while heating at lower temperature, eg. 100° and 150° C. were not well modified, while heating at higher temperature, eg. 350° C. were better modified. The best results were obtained by rapid evaporation of water at high enough temperatures.

Samples of the same cellulose with moisture content of 74% were heated in an oven at 250°, 300°, 350°, 450°, 550°, 600° and 800° C., in Thermolyne oven Type F-A 1730, using temperature controller, Thermolyne FURNATROL Sybron corporation, for 0.5, 1, 2, 5, 10, 15, 30, 60 and 120 minutes respectively. The thicknesses of the samples were less than 3 mm. The resulted products that were not charred showed the required soft characteristic.

Modification of bacterial cellulose by dry distillation to dryness under reduced pressure Samples of the cellulose were modified by rapid distillation of water to dryness under reduced pressure (55 mmHg) at 125° C. The product was a good quality fiber with a density of 5.195 g/ml. One gram of this fiber absorbed 21.0 ml and 17.5 ml of water in 30 minutes and 18 hours respectively.

Modification of bacterial cellulose by evaporation of water in a spray drier

Samples of the cellulose were modified by spray drying in a spray drier, NIRO AUTOMIZER, Denmark, with inlet temperatures of 200–250° C. and outlet temperatures of 130–150° C. The products were soft white powder with a density of 0.310 g/ml. One gram of this fibre absorbed 9.0 ml of water in 18 hours. When adjusted the inlet temperature to 150° C. and the outlet temperature to 95° C., the product was sticky pellets that become hard and brittle when dry. Drying of the water that was squeezed out from the fiber and water from bacterial culture, by spray drying Samples of water were squeezed out from the blended fibre and water from bacterial culture was spray dried in a spray drier, with an inlet temperature of 150° C. and an outlet temperature at 95° C. The products from both samples were sticky pellets that became hard and brittle when dry. But when adjusted the inlet temperature to 300° C., and outlet temperature to 150° C., the products from both samples were non-sticky powder.

Modification of the cellulose by frying in oil

Cellulose sheets about 2 mm thick were cut into small pieces about 2×2 inch. Fried the cellulose pieces in vegetable oil at 100–190° C., for 5–120 seconds. Water vapour and air bubbled out from the cellulose very rapidly, resulted in thin brown plates which were very tough. The above processes were repeated, but dried the cellulose pieces before frying, gave very similar product. Cellulose pieces after blending, washing and squeezing of the water until 74% moisture remained, were fried as described above. The product was not hard, and 1 gram of this product could swell in water to 13 ml in 18 hours.

The cellulose pieces that had been modified by rapid evaporation of water in a drum drier, when fried in oil the fiber charred quickly after contacted with oil. The product was fragile and broken down easily.

Modification of the cellulose by heating in a microwave oven

A sample of the cellulose that had been blended into micro fiber, with moisture content of 90% was placed in a glass plate about 1 mm thick. This was heated in a microwave oven. When it was dry this gave a soft fibre. One gram of this modified fiber swelled in water to 12.5 ml in 18 hours.

Modification of the cellulose under high pressure and temperature using village texturizer Samples of the cellulose were modified in a village texturizer at 100°, 130°, 150°, 170° and 200° C., at 200, 400, 600 and 700 psi. All samples gave good soft products that absorbed water very well. Samples modified at lower temperatures and pressures, eg. 100° C., 200 psi also gave as good products as samples that were modified at higher temperatures and pressures, but the later samples had lower moisture contents. A sample modified at 160° C., 600 psi had a density of 0.085 g/cc. One gram of this fibre swelled in water to 22.5 ml in 30 minutes and to 24.5 ml in 18 hours.

Modification of the cellulose at high temperature with an extruder

Samples of the cellulose fiber was modified in a twin screw extruder (Berstoff, EO, 0432/90) at 100°, 120° and 135° C. The cellulose fibre with moisture content of 74% was mixed with a food product (KASET PROTEIN, a product produced by the Institute for Research and Development of Food Products, Kasetsart University, Bangkok), which contains defatted soy flour (ADM BASKERS NUTRISOY FLOUR 063-100, IL USA) as the main ingredient, in the ratio of bacterial cellulose to the said KASET PROTECTION of 100:0, 90:10, 50:50, 25:75, 10:90, 5:95 and 0:100 respectively. The product from 100% cellulose had a diameter of 1.40 mm, with a density of 0.802 g/ml. One gram of this product swelled in water to 6.5 ml in 18 hours. The product from 90% cellulose with 10% KASET PROTEIN had a diameter of 3.3 mm. The products from 50, 25, 10 and 5% cellulose had the diameters of 3.2, 3.2, 3.3 and 3.6 mm respectively, while the product from 100% KASET PROTEIN without the cellulose had a diameter of 4.0 mm. The addition of 5, 10, 25 and 50% cellulose fiber into KASET PROTEIN made the products more brittle, and the sample with higher content of the cellulose would be better modified.

Modification of the cellulose by hot drum drier

Samples of the cellulose were dried rapidly in a double drum drier (Behpony 25) at 100° to 160° C. Both drums had diameters of 30 cm, with 45.5 cm length. The drums speed were 45 second per round. Another cellulose samples were dried in a single drum drier (P.I.V. Stufenlos, Type A SC 3) at 120–140° C. The density of the modified fibre was 0.085 g/cc. One gram of this fibre swelled in 100 ml of water to 28.0 ml in 18 hours. The product from the single drum drier had similar properties. The preferred temperature of single drum drier was 150–170° C.

Cellulose samples drying in the drum dryers at lower temperature containing about 51.1% moisture, after drying further in a hot oven at 60° C. gave a product of the same properties as the product that obtained at higher temperature.

Digestion of bacterial cellulose with chemicals under pressure, and modification in drum drier One part of cellulose sheets which had been boiled in hot water 3 times was mixed with one part of water, and blended in a high speed blender. The resultant mixture was digested with and without alkali under pressure according to a process disclosed in Setlur R. R. U.S. Pat. No. 5,023,103. The alkali was sodium hydroxide at concentrations in one case of 2% and in another 10% and digested in an autoclave at 121 degrees C. and 15 psi for one hour. The product was then neutralised with acetic acid and washed well with water. One part was dried in an oven at 60 degrees C. These samples acting as a control were hard and horn like.

The further samples were treated by applying heat at temperatures above 100 degrees C. and these exhibited the features of good and soft dietary fiber. Further the alkali treated fiber also showed higher water absorption than the treated fiber without alkali being used.

Treatment of bacterial cellulose with homogeniser, and modification in the drum drier Bacterial cellulose sheets which had been cleaned by boiling in hot water were blended in a high speed blender and treated in an homogeniser (Gaulin, Type 265 M33 TPSX, Gaulin Corp, Everrett, Mass.,USA).

One sample was homogenised once at 2500 psi and the second sample was homogenised twice at 2500 psi and once more at 3500 psi. The samples were then treated separately in a drum drier in accord with this invention and as has been previously described. The samples in both cases were softer those that were not homogenised.

Other similar processes for breaking the cellulose into micro-fibrillated cellulose can be fine media mill, agitated fine media mill and sand mill as disclosed in U.S. Pat. No. 4,761,203.

EXAMPLE 4

The swelling properties of the fibre

Cellulose fiber prior to washing off the toughening materials was modified by various methods as described in example 3. One gram of modified cellulose from each process was put into a measuring cylinder, water at 20° C. was added until reaching 100 ml mark. The volume of swollen fibre in the measuring cylinder was read after 30 minutes and 18 hours.

The densities and swelling properties of the modified fibers by various methods are given in Table 1:

TABLE 1

| Modification methods | Density (g/cc) | Swelling properties ml. | |
|---|---|---|---|
| | | 30 min. | 18 hr. |
| Hot drum drier | 0.085 | 24.5 | 24.5 |
| High temperature and pressure (village texturizer) | 0.085 | 22.5 | 24.5 |
| Extruder | 0.602 | 5.6 | 6.5 |

TABLE 1-continued

| Modification methods | Density (g/cc) | Swelling properties ml. | |
|---|---|---|---|
| | | 30 min. | 18 hr. |
| Spray Drier | 0.310 | 8.5 | 9.0 |
| Fried in hot oil | 0.258 | 12.5 | 13.0 |
| Heated in an oven | 0.075 | 12.5 | 12.5 |
| Heated in a microwave oven | 0.080 | 12.5 | 12.5 |

Cellulose fiber modified by hot drum drier had very good swelling property. One gram of the said fibre swelled to 24.5 ml in water in 30 minutes, and to 28.0 ml in 18 hours. The fibre modified at high temperature and pressure by a village texturizer had a good swelling property. One gram of such fibre swelled to 22.5 ml in water in 30 minutes, and to 24.5 ml in 18 hours. The swelling property of cellulose that modified by an extruder was not very good. The fiber modified by a microwave oven and by frying in oil had quite good swelling properties. The swelling properties also depended on the thickness of the fiber, operating temperature and operating time.

EXAMPLE 5

Effect of the modified cellulose when used as food additive

Samples of dietary fiber after being modified by various methods and ground into micro-fiber with a pin mill were filled into hard gelatine capsules No. 0,200 mg each. Volunteers took these capsules together with normal diet from 2.0 to 2×2.0 grams a day for 4 months. The volunteers after taking the dietary fibre with normal diet would feel full despite taking less food than normal, which made them lose their weight after taking the fibre. The bowel movements of the volunteers were also easy. Well modified dietary fiber gave the above mentioned effects better than the less modified fibre which had more toughening materials.

Efficiency of the dietary fiber after passing through human digestive tract

The well modified dietary fiber after passing through the human digestive tract was recovered. It was found that the fiber had swollen to nearly 100 times its dry state.

EXAMPLE 6

Inhibiting effect on various micro organisms by extracts from modified cellulose Inhibiting effect on micro-organisms by extracts from modified cellulose was studied as follows:

Two samples of the modified cellulose weight one gram each, one sample was added into 20 ml of alcohol while the other sample was added into 20 ml of water. Both mixtures were shaken at 55° C. for 48 hours, then filtered through thin cloth and through filter paper respectively. The solvents were evaporated at 55° C. to dryness and dissolve the residues in 0.5 ml of water. The sensitivity tests were carried out by paper disk method. The aqueous solutions of the residues obtained above, 30 ml each was dropped on the sterile paper disks placed on the culture disks which had been spread with micro organisms to be tested on the surfaces of the nutrients.

Sensitivity tests were also performed with alcohol and water extracts from unmodified cellulose, both from fresh cellulose before hardened and from already hardened cellulose.

Five species of bacterium were used in the sensitivity test. They were *Eschericia coli, Bacillus cereus, Leuconostoe monocytogenes, Staphylococcus aureus* and *salmonella* typhimurium. It was found that unmodified celluloses, both fresh cellulose before hardened and already hardened cellulose, both from alcohol extract as well as water extract did not inhibit the growth of all 5 species of bacterium.

Aqueous extract of modified cellulose did not inhibit the growth of all 5 bacterium, but alcoholic extract of modified cellulose did inhibit the growth of *staphyloccoccus aureus* providing a distinct clear zone with a diameter of 4.0 mm. This experiment showed that the modified cellulose allowed bacterial inhibiting to develop in the fiber or showing this activity in the fibre similar to the product from dry distillation of certain plant materials (Fukunaka T European Patent No. 0609779 A1).

From the above it will now be seen that there has been provided an important method of modifying gelatinous bacterial cellulose.

I claim:

1. A process to modify gelatinous bacterial cellulose, which includes the steps of:
   (i) treating the gelatinous cellulose to bring said cellulose into a form of micro-fiber cellulose and micro-fiber toughening materials, and
   (ii) heating the treated cellulose to a predetermined temperature of at least 100° C. to effect evaporation of water from the treated cellulose so as to modify the micro-fiber toughening materials and modify the micro-fiber cellulose in a way which inhibits hardening, thereby softening the resultant dried product and resulting in a soft, flexible and high absorption modified bacterial cellulose.

2. A process to modify bacterial cellulose to produce dried soft, flexible and high water absorption modified bacterial cellulose dietary fiber product, which includes the steps of:
   (i) treating the gelatinous cellulose to bring said cellulose into a form of micro-fiber and micro-fiber toughening materials, and
   (ii) softening the resultant material by heating for a predetermined time at a predetermined temperature of at least 100° C. whereby said treated cellulose inhibits bonding and denatures the micro-fibrils bond and promotes an effective evaporation of water from the treated cellulose so as to modify the micro-fiber toughening materials and the micro-fiber cellulose in a way which inhibits hardening thereby promoting softening of the resultant dried product, wherein heat modified binding properties of micro-fiber toughening materials and wherein heat denatures the micro-fibrils bond of micro-fiber cellulose and wherein an effective evaporation of water inhibits bonding of the resultant dried product.

3. The process for treatment of gelatinous bacterial cellulose as in claim 1 further characterized in that the softening step further comprises heating the material to a temperature of at least 100 degrees centigrade for a sufficient time to evaporate the moisture remaining in said cellulose.

4. The process as in claim 1 wherein the heating step (ii) is performed while the micro-fiber is subjected to a pressure exceeding atmospheric pressure, so as to modify the micro-fiber cellulose and micro-fiber toughening materials, inhibit hardening thereof, thereby softening the resultant dried product and resulting in soft, flexible and high absorption modified bacterial cellulose.

5. The process as in claim 1, wherein the treatment step (i) of the gelatinous cellulose in micro-fiber further comprises treating the micro-fiber at a pressure less than atmospheric pressure so as to modify the micro-fiber and micro-fiber toughening materials in a way which heat modified binding properties of micro-fiber and the effective evaporation of water by lower atmospheric pressure inhibits bonding of the resultant dried product, which results in soft, flexible and high absorption modified bacterial cellulose.

6. The process as claimed in claim 1 wherein the heat for evaporation provided by a device selected from the group consisting of an extruder, a hot drum drier including a hot surface, a spray drier using a stream of hot air, a hot air oven, a microwave oven, a village texturizer and a hot oil bath fryer.

7. A process as claimed in claim 1 wherein the recited method steps are first preceded by a production of cellulose by a cellulose producing bacterial strain.

8. A process of manufacture of bacterial cellulose which includes the steps of treating gelatinous bacterial cellulose by breaking the cellulose into a micro-fiber form, and then heating the micro-fiber form to above 100° C. so as to modify the micro-fiber cellulose in a way which inhibits hardening of the resultant dried product.

9. The process of manufacture of bacterial cellulose as in claim 1 which, before the first step of treating the gelatinous cellulose, further includes the steps of cutting cellulose sheet into small pieces and washing the pieces with boiling water at least three times each for about 10 minutes to reduce toughening materials absorbed in the fiber, beating the fiber into micro-fiber form in water to further release toughening materials, then, before step (ii), further washing said resultant material several times with water, and either pressing or decanting the fiber to remove excess water after each washing.

10. The process as in claim 2 wherein the softening step includes heating while the micro-fiber is subjected to higher than atmospheric pressure.

11. A process as claimed in claim 1, characterized in that the gelatinous bacterial cellulose of at least 5% is mixed with food ingredients prior to heating in step (ii).

12. The process as claimed in claim 1, wherein gelatinous bacterial cellulose is mixed with food ingredients prior to treating the gelatinous bacterial cellulose in step (i).

13. The cellulose product formed by the process of claim 1.

14. The process as claimed in claim 6, wherein after step (ii) there is a further step (iii) extracting alcohol from the modified bacterial cellulose, resulting in the alcohol extraction of modified bacterial cellulose which exhibits physiologically active properties active against *Staphylococcus aureus* bacteria.

15. A process to modify gelatinous bacterial cellulose, thereby producing dried soft, flexible and high water absorption modified bacterial cellulose product, the process including the steps of:
   (i) treating the gelatinous cellulose to bring said cellulose into a form of micro-fiber and micro-fiber toughening materials, and
   (ii) heating the treated cellulose to a predetermined temperature of at least 100° C. to create the effect of heat on the micro-fiber while enhancing rapid evaporation of water from the treated cellulose so as to modify the micro-fiber toughening materials and modify the micro-fiber cellulose in a way which inhibits hardening, thereby softening the resultant dried product and resulting in a soft, flexible and high absorption modified bacterial cellulose.

16. The cellulose product formed by the process of claim 2.

17. The cellulose product formed by the process of claim 8.

18. The cellulose product formed by the process of claim 9.

19. The cellulose product formed by the process of claim 12.

20. The cellulose product formed by the process of claim 14.

* * * * *